(12) United States Patent
Flores

(10) Patent No.: US 8,881,593 B2
(45) Date of Patent: Nov. 11, 2014

(54) CYLINDRICAL BRIDGE

(75) Inventor: Paco Gregor Flores, Felton, CA (US)

(73) Assignee: Seagate Technology LLC, Cupertino, CA (US)

( * ) Notice: Subject to any disclaimer, the term of this patent is extended or adjusted under 35 U.S.C. 154(b) by 317 days.

(21) Appl. No.: 13/482,986

(22) Filed: May 29, 2012

(65) Prior Publication Data
US 2013/0319124 A1 Dec. 5, 2013

(51) Int. Cl.
G01M 7/06 (2006.01)
G01B 15/04 (2006.01)
B06B 1/00 (2006.01)
B06B 3/00 (2006.01)

(52) U.S. Cl.
USPC .................................. 73/662; 73/663; 73/651

(58) Field of Classification Search
USPC ............................ 73/662, 663, 667, 668, 651
See application file for complete search history.

(56) References Cited

U.S. PATENT DOCUMENTS

| 4,392,381 | A | * | 7/1983 | Martin | 73/663 |
|---|---|---|---|---|---|
| 4,428,055 | A | * | 1/1984 | Zurbrick et al. | 700/160 |
| 4,495,703 | A | * | 1/1985 | Sakata et al. | 33/503 |
| 4,630,374 | A | * | 12/1986 | Raleigh | 33/1 M |
| 4,780,963 | A | * | 11/1988 | McMurtry | 33/558 |
| 4,958,437 | A | * | 9/1990 | Helms | 33/503 |
| 5,024,096 | A | | 6/1991 | Gregory et al. | |
| 5,058,433 | A | * | 10/1991 | Wilson et al. | 73/651 |
| 5,083,463 | A | * | 1/1992 | Marshall et al. | 73/663 |
| 6,330,828 | B1 | * | 12/2001 | Nagl et al. | 73/668 |
| 6,484,571 | B1 | * | 11/2002 | Hidaka et al. | 73/105 |
| 6,568,272 | B2 | | 5/2003 | Fukushima et al. | |
| 6,860,152 | B2 | | 3/2005 | Lund et al. | |
| 7,222,434 | B2 | * | 5/2007 | Kikuchi | 33/503 |
| 7,667,925 | B2 | | 2/2010 | Kim et al. | |
| 7,890,278 | B2 | | 2/2011 | Vacar et al. | |
| 7,924,020 | B2 | | 4/2011 | Wang et al. | |
| 7,996,174 | B2 | | 8/2011 | Garcia et al. | |
| 8,069,727 | B2 | * | 12/2011 | Bougaev et al. | 73/663 |
| 2012/0103100 | A1 | * | 5/2012 | Sueki | 73/662 |

* cited by examiner

Primary Examiner — Helen Kwok

(57) ABSTRACT

A vibration test fixture includes a shaker and a slip plate coupled with the shaker. A mounting plate may be coupled with the slip plate and a cylindrical bridge may be coupled with the mounting plate. A sensor may be coupled with the bridge.

21 Claims, 6 Drawing Sheets

CYLINDRICAL BRIDGE

FIELD OF THE INVENTION

Embodiments according to the present invention generally relate to vibration test fixtures.

BACKGROUND OF THE INVENTION

Vibration test systems may be used to vibrate a workpiece secured by a test fixture. For example, a vibration test system may use a shaker to vibrate the workpiece. The vibration test system may then measure the effect of the vibration on the workpiece. The applied vibration may be varied in frequency and/or amplitude and the effect of the different frequencies and/or amplitudes on the workpiece may be measured, for example, by using a probe.

Vibration test systems may be used to vibrate and measure disk drive storage devices or components thereof. In magnetic recording media, for example as used in disk drive storage devices, a read/write head writes to and reads from magnetic elements that represent digital bits on a hard disk. The magnetic elements may be arranged in circular and concentric data tracks on the surface of one or more disks of the disk drive storage device. The read/write head must be within a certain distance from the data tracks in order to accurately read from and write to the magnetic elements.

Vibration test systems may be used to determine the effects of vibration on components of a disk drive storage device. For example, a vibration test system may measure the displacement of the read/write head from a data track in response to an applied vibration.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
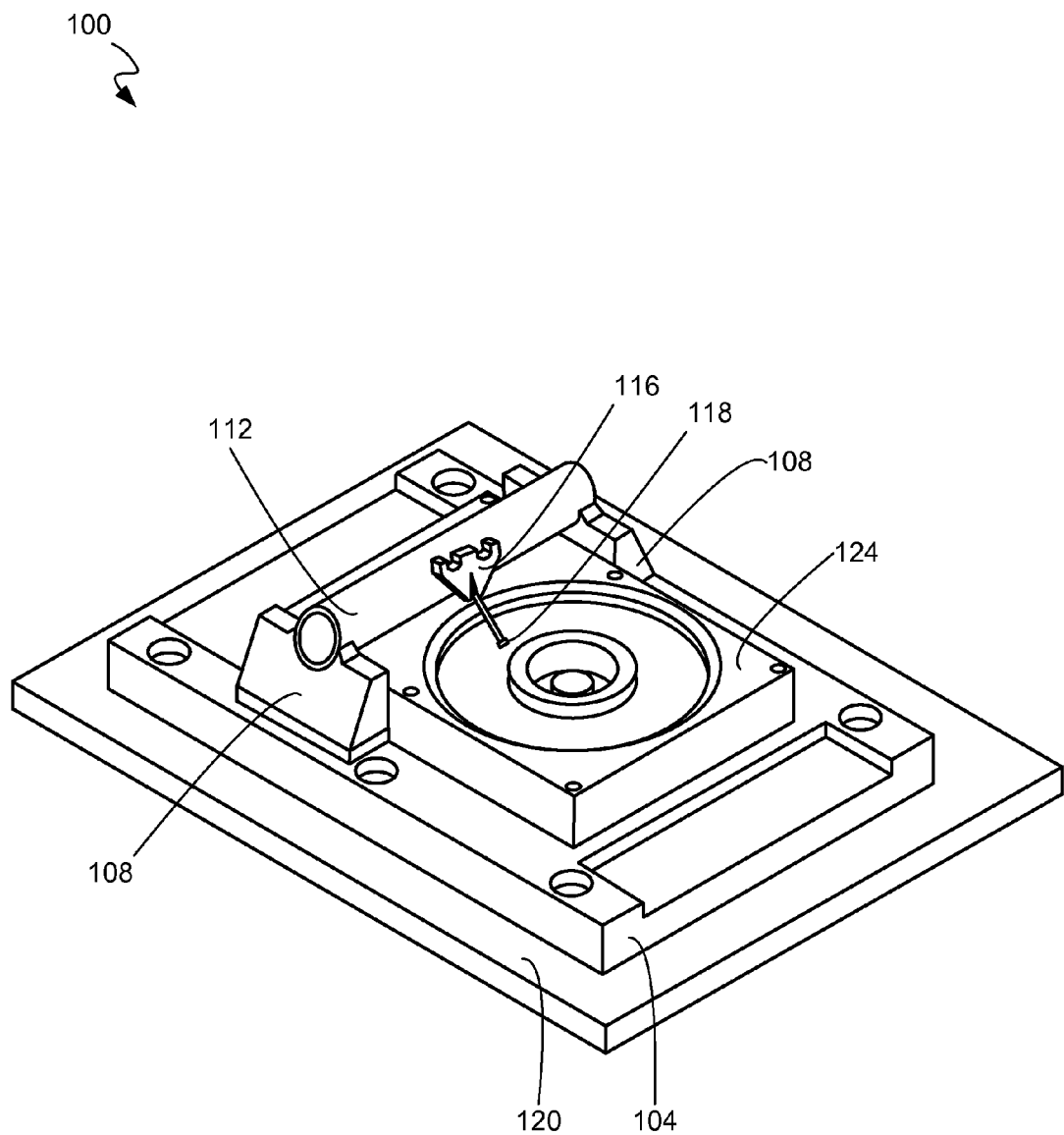
FIG. 1 is a perspective view of an exemplary vibration test fixture, according to an embodiment of the present invention.

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

For expository purposes, the term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Embodiments of the present invention provide methods and systems for applying vibration to a workpiece, for example, a disk drive storage device or components thereof. However, embodiments of the present invention can be applied to any object. Furthermore, embodiments of the present invention substantially reduce the distortion of generated vibration to a workpiece in a test fixture, thus reducing errors in measurements of the vibration. In various embodiments, the distortion and corresponding measurement error of high frequency vibrations are reduced.

Vibration test systems may be used to apply vibration to a workpiece secured by a test fixture, for example by using a shaker. The vibration test system may then measure the effect of the vibration on the workpiece. The applied vibration may be varied in frequency and/or amplitude and the effect of the different frequencies and/or amplitudes on the workpiece may be measured, for example by using a probe or sensor.

As the frequency and/or amplitude of the vibration is varied, different amounts or types of errors may be introduced by the structure of the test fixture securing the workpiece. For example, when the test fixture generates a vibration at a certain frequency, the frequency of the vibration may be distorted by different components in the test fixture, which may cause an attenuation or amplification of a generated vibration, or a vibration that may be off-axis to the generated vibration, to reach the workpiece. Embodiments of the present invention reduce or eliminate the distortion of the generated vibration, allowing a minimally distorted vibration to reach the workpiece.

In another example, a probe that measures the effect of vibration on a workpiece may be part of the test fixture. The probe may be caused to vibrate relative to the workpiece, which may cause the measurement of the probe to be distorted. Embodiments of the present invention reduce or eliminate amplification or attenuation of the vibration of the probe relative to the workpiece, allowing the probe to make a more accurate measurement of the effect of vibration on the workpiece.

In addition, when the frequency of the generated vibration increases, the measurement error of the effect of the vibration applied to the workpiece may substantially increase. Embodiments of the present invention reduce or eliminate the measurement error of the effect of high frequency vibration applied to the workpiece.

Generally, when external vibration is applied to a hard disk drive device or hard drive assembly, components of the device may be caused to move. For example, hard disk drive devices are often enclosed in a multi-drive rack system. Natural modes of the rack system may subject the hard disk drive devices to vibration. When external vibration is applied to a hard disk drive device, a fluid dynamic bearing motor and hard disks that may be coupled with the fluid dynamic bearing motor may be caused to be displaced with respect to a read/write head. Some hard disk drive devices may include a servo system that may be able to compensate for the relative displacement. However, when the amplitude and/or frequency of the external vibration increases passed a certain level, the ability of the servo system to compensate for the displacement of the read/write head may be exceeded.

Vibration testing systems may be used to apply vibration to a hard drive assembly (HDA) or a motor base assembly (MBA). An HDA may be a fully manufactured data storage device, for example as discussed with relation to FIG. 3. An HDA may also be a partially manufactured data storage device, for example, a data storage device without a cover or a read/write head. An MBA may include components of a fluid dynamic bearing motor and other components that support the fluid dynamic bearing motor, but without other components of a data storage device. For example, an MBA may or may not include data storage disks. In addition, an MBA may or may not include a positional error signal system to measure the effect of vibration on the MBA.

The HDA or MBA may be secured by a test fixture and a shaker may be used to apply the vibration. The vibration test system may then measure the effect of different frequencies and/or amplitudes on the HDA or MBA. Accordingly, vibration test systems may determine the displacement of a read/write head, a disk, or a fluid dynamic bearing motor in response to a range of frequencies and/or amplitudes of vibration.

In order to increase the amount of information that can be stored within a given area, the size and distance between the magnetic elements on the surface of the disks may be reduced so that they may be more densely positioned. As a result, the data tracks may be more closely positioned. Consequently, the displacement of the read/write head with respect to the disks or data tracks as a result of vibration may be continually reduced to ensure accurate reading and writing of data. Accordingly, vibration test systems may be able to detect finer displacements or displacements in response to high frequencies. A vibration test system's ability to achieve such results is improved by more accurately applying vibration without distortions as well as more accurately measuring the effects of such vibration.

FIG. 1 is an exemplary vibration test fixture 100, in accordance with an embodiment of the present invention. Vibration test fixture 100 may include a mounting plate 104, legs 108, bridge 112, probe holder 116, and a probe 118. The mounting plate 104 may be coupled with the legs 108, which in turn may support the bridge 112. The bridge 112 may support the probe holder 116.

The mounting plate 104 may be coupled with a slip plate 120 that is operable to introduce vibration at various frequencies and/or amplitudes with the aid of, for example, a shaker (not shown) that generates the vibration. The shaker may be positioned below, above, or lateral to the slip plate 120. The mounting plate 104 may also be operable to secure a workpiece 124. The workpiece 124 may be, for example, an HDA or an MBA.

The probe holder 116 may be operable to secure the probe 118 that may be used to measure the effect of vibration on the workpiece 124. The probe 118 may be, for example, a capacitance probe. Because the probe holder 116 may be ultimately coupled with the slip plate 120, the probe holder 116 and corresponding probe 118 may be vibrated by the slip plate 120. The vibration of the probe 118 may interfere with the accurate measuring of vibration on the workpiece 124. Such interference, or measurement error, may be described by the displacement of the probe 118 with respect to the mounting plate 104, legs 108, bridge 112, probe holder 116, or slip plate 120. The error may also be described by the displacement of the probe 118 with respect to components of the workpiece 124, for example the baseplate of a data storage device if the workpiece 124 is a data storage device.

Further error may be introduced because the vibration that travels to the workpiece 124 may be distorted with respect to the generated vibration. For example, the vibration generated by the shaker may travel to the workpiece 124 through the slip plate 120 or mounting plate 104. However, the vibration that reaches the workpiece 124 may be different from the vibration generated by the slip plate 120 because the vibration travels through the slip plate 120 or mounting plate 104, which may alter the vibration.

Moreover, the vibration that travels to the workpiece 124 may be distorted with respect to the generated vibration because of resonances caused by other components in the vibration test fixture 100, including the legs 108, bridge 112, probe holder 116, as well as the slip plate 120. Such resonances may further increase measurement error.

Figure 2:
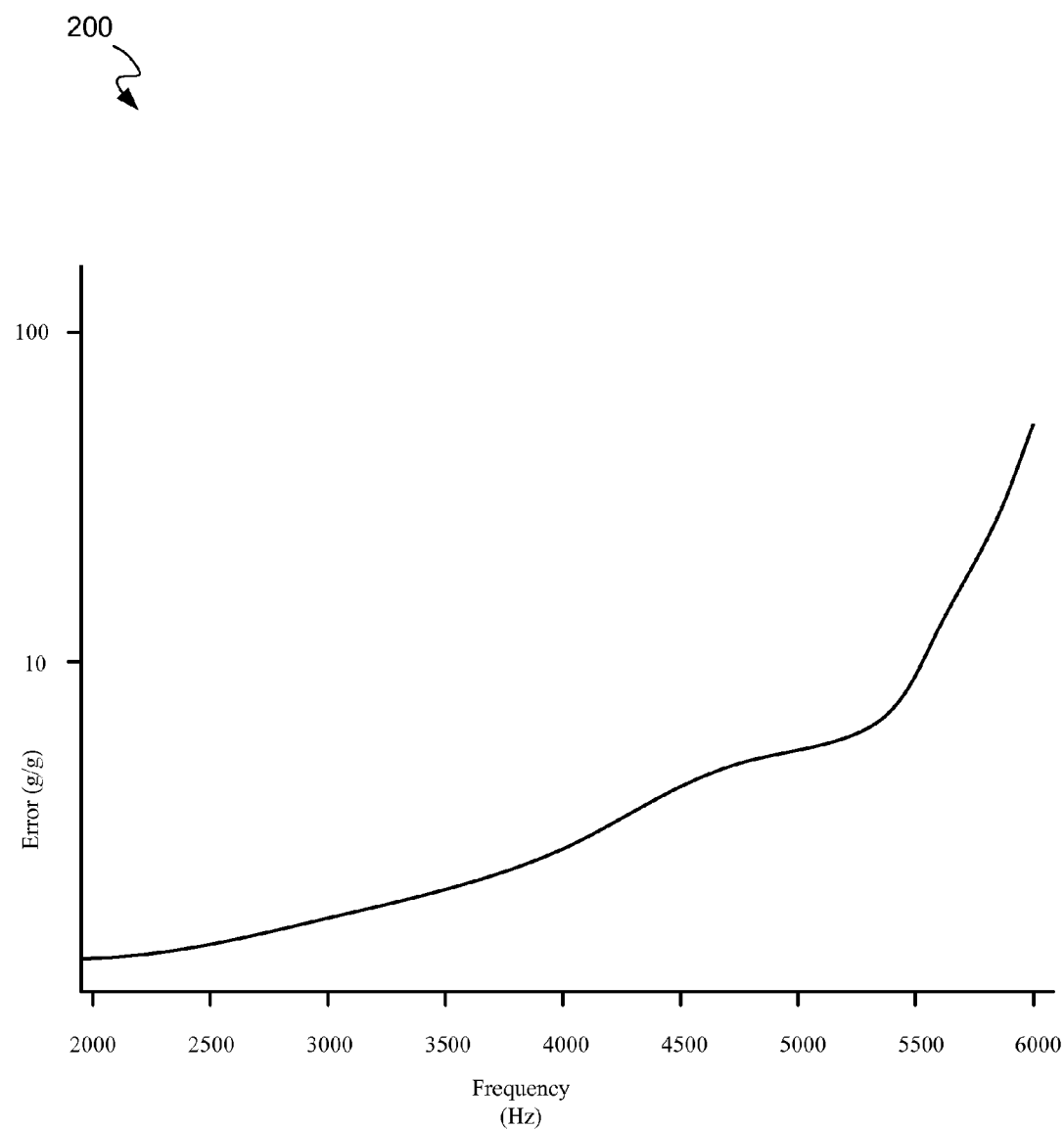
FIG. 2 is a graph of an example of vibration error as a function of vibration frequency, according to an embodiment of the present invention.

In addition, as the frequency of the generated vibration increases, the error caused by low-stiffness, heavy, and/or unbalanced components may increase, which ultimately reduces the accuracy of the measurements. For example, FIG. 2 is a graph 200 of an example of vibration error as a function of vibration frequency. The x-axis of the graph represents the generated vibration frequency and the y-axis of the graph represents the resulting error corresponding to the generated vibration frequency.

As depicted by the graph 200, the error increases as the vibration frequency increases. In some cases, the error may increase disproportionally or exponentially in relation to the frequency. For example, the error corresponding to generated vibration frequencies of 3 kHz and above may be too great for measuring finer displacements such as those required for measuring the movement of densely positioned data tracks on a hard disk.

Returning to FIG. 1, further error may be introduced by the slip plate 120 or the shaker. For example, the shaker may generate vibration with imperfections that cause the vibration to be different from an ideal or intended vibration. Additionally, depending on the position of the shaker with respect to the slip plate 120, the distortion of the generated vibration may be different with each position of the shaker. The imperfections may be further amplified by the components of the vibration test fixture or other components of the vibration testing system generally. For example, components that are relatively heavy, high in mass, or unbalanced may amplify the imperfections in the vibration.

In order to reduce or substantially eliminate the error resulting from the problems discussed above, embodiments of the present invention allow for vibration test fixture components with increased stiffness and/or reduced weight. For example, to increase the stiffness and reduce the weight of the vibration test fixture, various components of the vibration test fixture may be formed by materials with high stiffness to weight ratios. Such materials with high stiffness to weight ratios allow for minimal distortion of high frequency vibration. For example in some embodiments, there may be less than a 1 μin/g difference in movement between the shaker and the probe 118, e.g. a sensor.

For example, the mounting plate 104, legs 108, bridge 112, probe holder 116, and/or slip plate 120 may be formed by materials with high stiffness to weight ratios. Such materials may include boron carbide (with a stiffness/weight ratio of 184 MNm/kg), beryllium (163 MNm/kg), silicon carbide (134 MNm/kg), and ceramics including alumina (94 MNm/kg). While alumina has the lowest ratio of the materials listed above, it is machinable, affordable, and readily available. It should be appreciated that the stiffness to weight ratios of the materials listed above are substantially larger than that of other materials like stainless steel or aluminum, which have ratios between 24-29 MNm/kg. Using alumina instead of stainless steel or aluminum for a component may, for example, double a first mode frequency.

It is appreciated that embodiments of the present invention allow for reduced or eliminated error resulting from the problems discussed above by reducing the total mass of the vibration test fixture components. For example, to reduce the mass of vibration test fixture components, various components may be formed by hollow shapes. For example, the bridge 112 may be formed by a hollow shape. As a result, the bridge 112 may have less mass because the core of the bridge 112 is empty and at the same time the bridge 112 may still support the probe holder 116. For example, in various embodiments of the invention, the cylinder may have a 1 inch outer diameter and a 0.75 inch inner diameter.

It should be further appreciated that the hollow component may be in the shape of a cylinder, cube, cone, triangular prism, hexagonal prism, pentagonal prism, or any other shape. In various embodiments, a cylindrical shape may be optimal for decreasing error. It should also be appreciated that the mounting plate 104, legs 108, bridge 112, probe holder 116, slip plate 120, and/or other components of the vibration test fixture may be formed by hollow shapes.

In addition, to reduce or eliminate the error resulting from the problems discussed above, embodiments of the present invention allow for vibration test fixture components with cylindrical, circular, or spherical shapes. A cylindrical, circular, or spherical shape is equally stiff in multiple directions. As a result, such a geometry allows for minimal or no distortion of vibration in multiple directions (e.g., inline, axial, or twisting) and for high frequency vibration with minimal or no error. For example, the bridge 112 may be formed by a cylindrical shape.

Accordingly, embodiments of the present invention allow for reduced or eliminated error caused by a generated vibration, including for example, generated vibrations with a frequency higher than 3 kHz. For example, there may be reduced or eliminated measurement error when applying a vibration frequency of 6 kHz to a 3.5 inch HDA/MBA workpiece. In another embodiment, there may be reduced or eliminated measurement error when applying a vibration frequency of 8 kHz to a 2.5 inch HDA/MBA workpiece.

Figure 3:
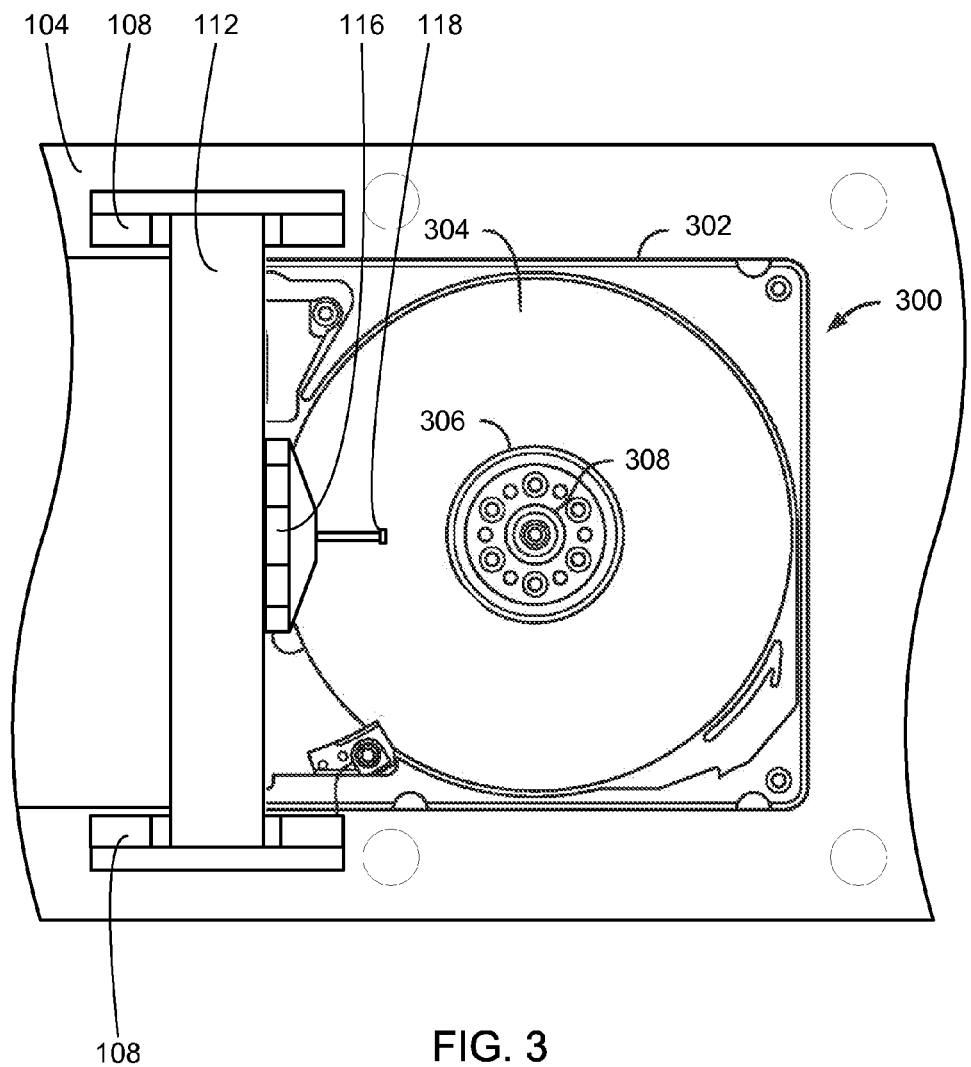
FIG. 3 is a plan view of a portion of the test fixture and workpiece of FIG. 1, according to an embodiment of the present invention.

FIG. 3 is a plan view of a portion of the test fixture and workpiece 300 of FIG. 1, according to an embodiment of the present invention. In various embodiments, the workpiece 300 may be a disk drive. The disk drive 300 generally includes a base plate 302 and a cover (not shown) that may be disposed on the base plate 302 to define an enclosed housing for various disk drive components. The disk drive 300 includes one or more data storage disks 304 of computer-readable data storage media.

Typically, both of the major surfaces of each data storage disk 304 include a plurality of concentrically disposed tracks for data storage purposes. Each data storage disk 304 is mounted on a hub or spindle 306, which in turn is rotatably interconnected with the base plate 302 and/or cover. Multiple data storage disks 304 are typically mounted in vertically spaced and parallel relation on the spindle or shaft 306. A spindle motor 308 rotates the data storage disks 304.

A probe 118 may be supported by a probe holder 116, which in turn may be supported by a bridge 112. The bridge 112 may be supported by legs 108, which in turn may be supported by a mounting plate 104. During a measuring operation, the probe 118 may be positioned above the disk drive 300. The probe 118 may measure the displacement of the probe 118 with respect to points on the disk drive 300 in response to vibration. For example, the probe 118 may measure the displacement of the probe 118 with respect to the data storage disks 304, hub or spindle 306, or spindle motor 308 in at least the axial and/or radial direction.

Figure 4:
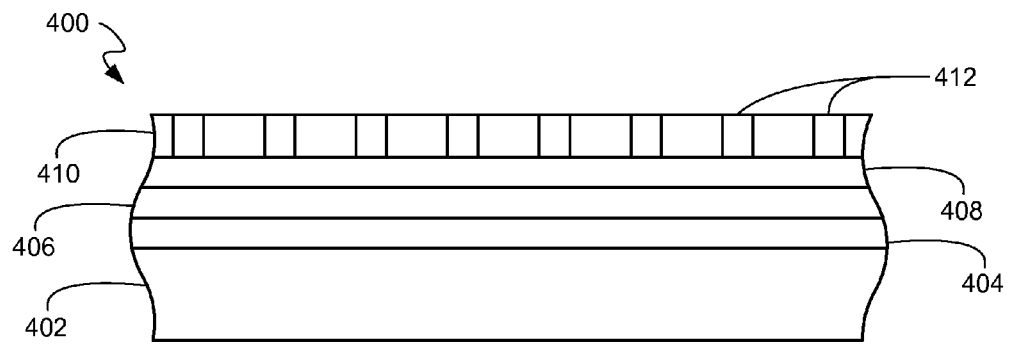
FIG. 4 is a simplified cross-sectional view of a perpendicular magnetic recording medium, which may be included in the workpiece, according to an embodiment of the present invention.

FIG. 4 is a simplified cross-sectional view of a perpendicular magnetic recording medium 400, which may be included in the workpiece, according to an embodiment of the present invention. The perpendicular magnetic recording medium 400 is an apparatus that may include multiple layers established upon a substrate 402. A seed layer 408 may be a layer that is established overlying the substrate. A base layer 410 may be a layer that is established overlying the seed layer 408. Perpendicular magnetic recording islands 412 are recording areas that are established in the base layer 410 and on the seed layer 408. The perpendicular magnetic recording islands 412 may form concentric tracks on the base layer 410.

The substrate 402 can be fabricated from materials known to those skilled in the art to be useful for magnetic recording media for hard disk storage devices, including materials that may be used in conjunction with HAMR technology. For example, the substrate 402 may be fabricated from aluminum (Al) coated with a layer of nickel phosphorous (NiP), glass and glass-containing materials including glass-ceramics, and ceramics including crystalline, partly crystalline, and amorphous ceramics. The substrate 402 may have a smooth surface upon which the remaining layers can be deposited. The remaining layers may include materials that may be used in conjunction with HAMR technology. For example, high-coercivity magnetic compounds such as iron-platinum (FePt) or cobalt-platinum (CoPt) alloys.

In a further embodiment, a buffer layer 404 may be established overlying the substrate 402, a soft underlayer 406 may be established overlying the buffer layer 404, and the seed layer 408 may be overlying the soft underlayer 406. The buffer layer 404 can be established from elements such as Tantalum (Ta). The soft underlayer 406 can be established from soft magnetic materials such as CoZrNb, CoZrTa, FeCoB and FeTaC. The soft underlayer 406 can be formed with a high permeability and a low coercivity. For example, in an embodiment the soft underlayer 406 may have a coercivity of not greater than about 10 oersteds (Oe) and a magnetic permeability of at least about 50. The soft underlayer 406 may comprise a single soft underlayer or multiple soft underlayers, and may be separated by spacers. If multiple soft underlayers are present, the soft underlayers can be fabricated from the same soft magnetic material or from different soft magnetic materials.

In the embodiment illustrated, the seed layer 408 is disposed on the soft underlayer 406. The seed layer 408 can be established, for example, by physical vapor deposition (PVD) or chemical vapor deposition (CVD) from noble metal materials such as, for example, Ru, Ir, Pd, Pt, Os, Rh, Au, Ag or other alloys. The use of these materials results in desired growth properties of the perpendicular magnetic recording islands 412.

The perpendicular magnetic recording islands 412 as described herein may be formed within the base layer 410 and on the seed layer 408 according to the embodiments of the present invention. The perpendicular magnetic recording islands 412 can be established to have an easy magnetization axis (e.g., the C-axis) that is oriented perpendicular to the surface of the perpendicular magnetic recording medium 400. Useful materials for the perpendicular magnetic recording islands 412 may include, for example, cobalt-based alloys with a hexagonal close packed (hcp) structure. Cobalt can be alloyed with elements such as chromium (Cr), platinum (Pt), boron (B), niobium (Nb), tungsten (W) and tantalum (Ta).

The perpendicular magnetic recording medium 400 can also include a protective layer (not shown) on top of the perpendicular magnetic recording islands 412 and/or the base layer 410, such as a protective carbon layer, and a lubricant layer disposed over the protective layer. These layers are adapted to reduce damage from the read/write head interactions with the recording medium during start/stop operations. It should be appreciated that embodiments of the present invention can be applied with the use of non-perpendicular magnetic recording mediums as well, e.g., a longitudinal recording medium.

Figure 5:
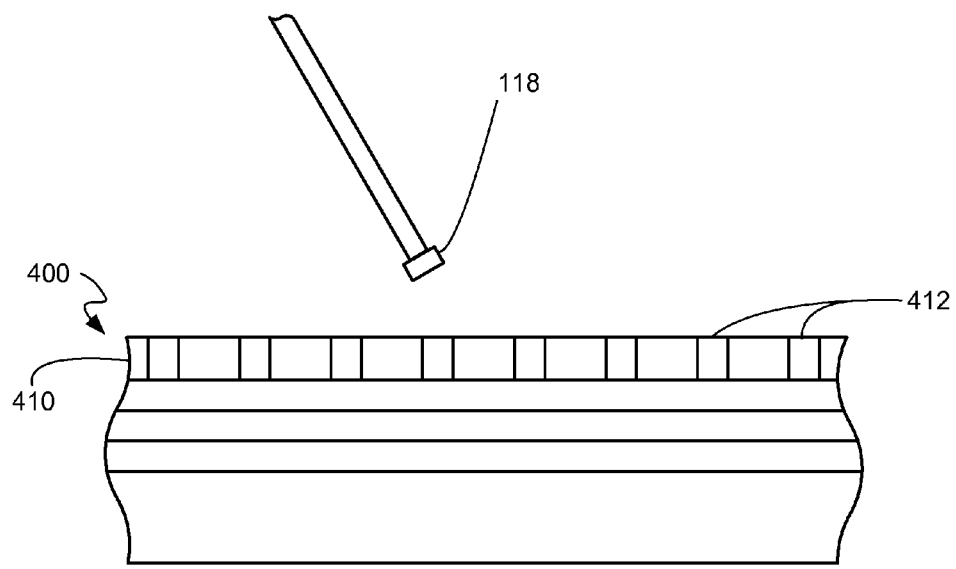
FIG. 5 is a simplified cross-sectional view of a portion of the perpendicular magnetic recording medium with a probe.

FIG. 5 is a simplified cross-sectional view of a portion of the perpendicular magnetic recording medium 400 with a probe 118. During a measuring operation, the probe 118 may be positioned above or laterally to the perpendicular magnetic recording medium 400. The probe 118 may measure at least a radial and/or an axial displacement of the probe 118 with respect to points on the perpendicular magnetic recording medium 400 in response to vibration. For example, the probe 118 may measure the displacement of the probe 118 with respect to the top surface of the perpendicular magnetic recording medium 400, the outside-diameter of the perpendicular magnetic recording medium 400, or concentric tracks on the base layer 410 formed by the perpendicular magnetic recording islands 412.

Figure 6:
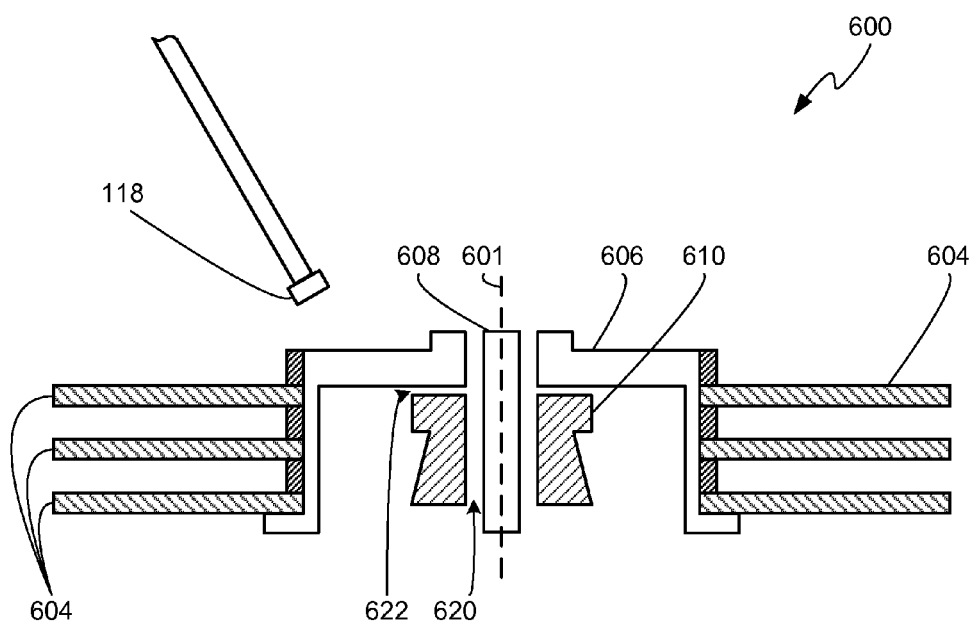
FIG. 6 is a cross-sectional view of a fluid dynamic bearing motor, which may be the workpiece or may be included in the workpiece, according to an embodiment of the present invention.

FIG. 6 is a cross-sectional view of a fluid dynamic bearing motor 600, which may be the workpiece or may be included in the workpiece, according to an embodiment of the present invention. The fluid dynamic bearing motor 600 may be used in the disk drive 300 (FIG. 3). For example, data storage disks 604 may correspond to the data storage disks 304 (FIG. 3). However, the fluid dynamic bearing may or may not include any data storage disks 604 for measurement purposes.

The fluid dynamic bearing motor 600 may reduce wear by reducing friction while maintaining the alignment between a hub 606, a shaft 608, and/or a sleeve 610. The data storage disks 604 may be supported and rotated by the fluid dynamic bearing motor 600 about a centerline axis 601.

The data storage disks 604 may be rotated at high speeds during operation using magnets (not shown) and a stator (not shown). Magnets, for example mounted on the hub 606 may interact with the stator to cause rotation of the hub 606 relative to the stator. The magnets may be formed as a unitary annular ring or may be formed as a plurality of individual magnets that are spaced about the periphery of the hub. The magnets may be magnetized to form two or more magnetic poles.

The fluid dynamic bearing motor 600 includes a stationary component and a rotatable component. The rotatable component rotates relative to the stationary component and defines a fluid dynamic journal bearing 620 and a thrust bearing 622 therebetween.

During a measuring operation, the probe 118 may be positioned above or laterally to the fluid dynamic bearing motor 600 or its components. The probe 118 may measure at least a radial and/or an axial displacement of the probe 118 with respect to points on the fluid dynamic bearing motor 600 or data storage disks 604 in response to vibration. For example, the probe 118 may measure the displacement of the probe 118 with respect to the top surface or outside-diameter of the hub 606, shaft 608, or sleeve 610, as well as concentric tracks on the data storage disks 604.

Figure 7:
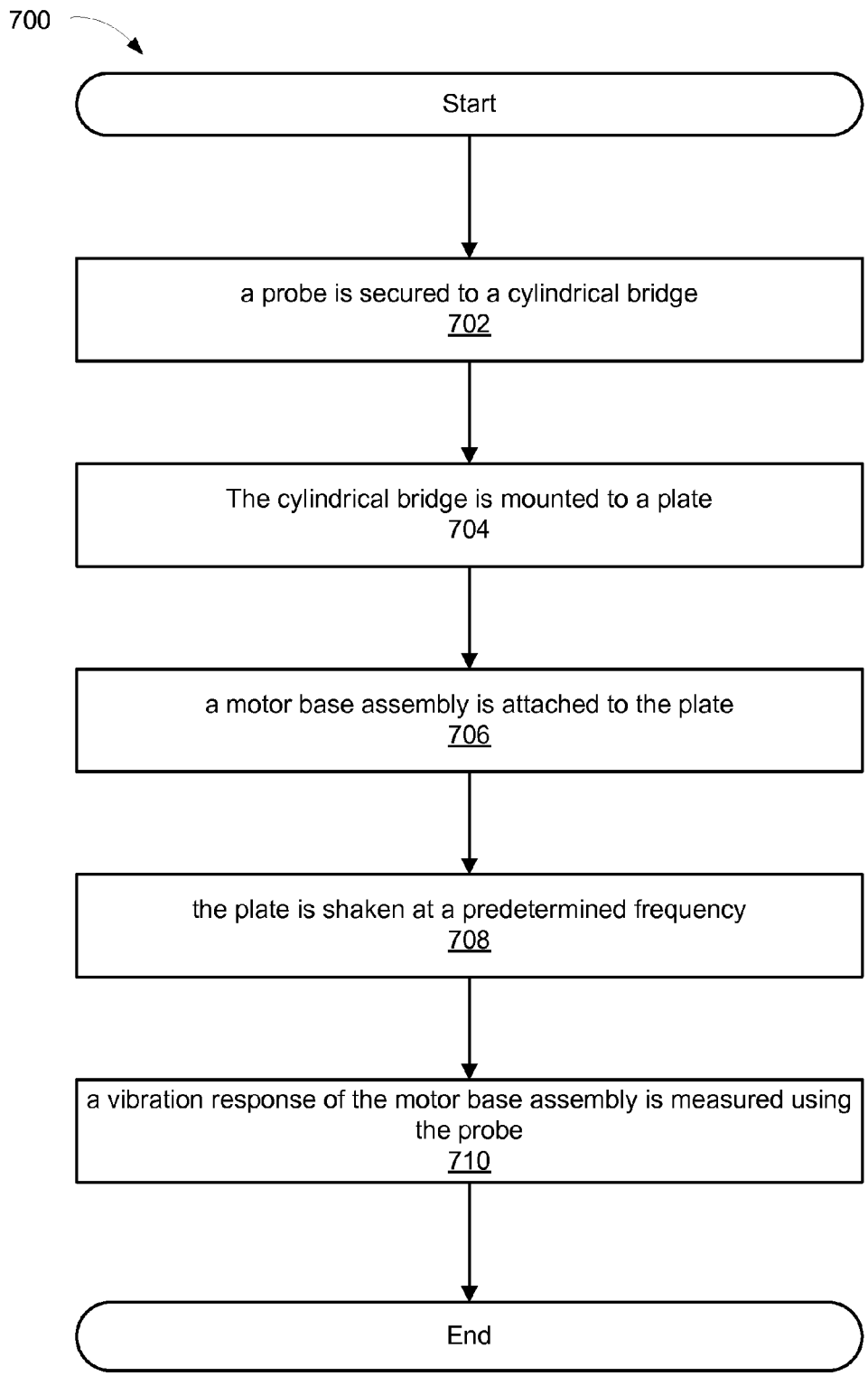
FIG. 7 depicts a flowchart of an exemplary process of measuring a vibration response of a motor base assembly, according to an embodiment of the present invention.

FIG. 7 depicts a flowchart 700 of an exemplary process of measuring a vibration response of a motor base assembly, according to an embodiment of the present invention. In a block 702, a probe or sensor is secured to or coupled with a cylindrical bridge. In various embodiments, a probe holder is attached to the bridge and the probe holder secures a probe. For example, in FIG. 1, a probe may be secured to the bridge through a probe holder.

In various embodiments, the bridge has a stiffness-to-weight ratio of between 30 and 200 MNm/kg. In an embodiment, the cylindrical bridge includes alumina. In various embodiments, the cylindrical bridge is substantially hollow. For example, in FIG. 1, the bridge is cylindrical and hollow. In an embodiment, the cylindrical bridge has a ratio of inner diameter to outer diameter of between 0.40 and 0.90.

In a block 704 of FIG. 7, the bridge is mounted to a plate. For example, in FIG. 1, the bridge is mounted to the mounting plate or the slip plate. In various embodiments, the plate may be coupled with a shaker. For example, in FIG. 1, the mounting plate and/or the slip plate are coupled with a shaker. In an embodiment, a mounting plate is coupled with the slip plate. In various embodiments, the cylindrical bridge may be coupled with the mounting plate.

In a block 706, a motor base assembly is attached to the plate. For example, in FIG. 1, a workpiece that may be a motor base assembly is coupled with the mounting plate or the slip plate.

In a block 708, the plate is shaken at a predetermined frequency. For example, in FIG. 1, a shaker may generate and apply vibration to the mounting plate or the slip plate. In an embodiment, the predetermined frequency includes a frequency greater than 6 kHz.

In a block 710, a vibration response of the motor base assembly is measured using the probe. In various embodiments, the sensor or probe is operable to measure a relative displacement between a workpiece and the sensor or probe. For example, in FIG. 1, a probe (not shown) coupled with the probe holder may measure the displacement between a workpiece and the probe. In an embodiment, the sensor or probe includes a capacitance probe. In various embodiments, the measuring includes recording a relative displacement between the motor base assembly and the probe. In some embodiments, the shaker is coupled to and operable to shake the motor base assembly, e.g. a workpiece, and the sensor is operable to measure a relative displacement between the workpiece and the sensor, wherein there is less than a 1 μin/g difference in movement between the shaker and the sensor.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A system comprising:
    a shaker;
    a slip plate coupled with said shaker;
    a mounting plate coupled with said slip plate;
    a cylindrical bridge coupled with a plurality of legs to said mounting plate; and
    a sensor coupled with said cylindrical bridge, between said plurality of legs.

2. The system of claim 1 wherein said cylindrical bridge comprises a material having a stiffness-to-weight ratio of between 30 and 200 MNm/kg.

3. The system of claim 1 wherein said cylindrical bridge comprises alumina.

4. The system of claim 1 wherein said cylindrical bridge is substantially hollow.

5. The system of claim 1 wherein said cylindrical bridge comprises a ratio of inner diameter to outer diameter of between 0.40 and 0.90.

6. The system of claim 1 wherein said shaker is coupled to and operable to shake a workpiece and said sensor is operable to measure a relative displacement between said workpiece and said sensor, wherein there is less than a 1 $\mu$in/g difference in movement between said shaker and said sensor.

7. The system of claim 6 wherein said sensor comprises a capacitance probe.

8. An apparatus comprising:
    a mounting plate;
    a cylindrical bridge attached to a plurality of legs to said mounting plate;
    a probe holder attached to said cylindrical bridge, between said plurality of legs; and
    a probe secured to said probe holder and wherein,
        said probe is operable to measure a relative displacement between a device and said probe, and
        said device is coupled to said mounting plate.

9. The apparatus of claim 8 wherein said cylindrical bridge comprises a stiffness-to-weight ratio of between 30 and 200 MNm/kg.

10. The apparatus of claim 8 wherein said cylindrical bridge comprises alumina.

11. The apparatus of claim 8 wherein said cylindrical bridge is substantially hollow.

12. The apparatus of claim 11 wherein said cylindrical bridge comprises a ratio of inner diameter to outer diameter of between 0.40 and 0.90.

13. The apparatus of claim 8 further comprising a shaker and wherein said mounting plate is secured to said shaker.

14. The apparatus of claim 8 wherein said probe comprises a capacitance probe.

15. A method comprising:
    securing a probe to a cylindrical bridge, between a plurality of legs;
    mounting said cylindrical bridge to a plate;
    attaching a motor base assembly to said plate;
    shaking said plate at a predetermined frequency; and
    measuring a vibration response of said motor base assembly using said probe.

16. The method of claim 15 wherein said cylindrical bridge comprises a stiffness-to-weight ratio of between 30 and 200 MNm/kg.

17. The method of claim 15 wherein said cylindrical bridge comprises alumina.

18. The method of claim 15 wherein said cylindrical bridge is hollow.

19. The method of claim 15 wherein said predetermined frequency comprises a frequency greater than 6 kHz.

20. The method of claim 19 wherein said measuring comprises recording a relative displacement between said motor base assembly and said probe.

21. The system of claim 1 wherein said plurality of legs are a plurality of triangular legs.

* * * * *